United States Patent
Asai

(10) Patent No.: US 6,510,928 B2
(45) Date of Patent: Jan. 28, 2003

(54) BRAKE CABLE MOUNTING STRUCTURE FOR A DRUM BRAKE DEVICE

(75) Inventor: Seiji Asai, Okazaki (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/091,167

(22) Filed: Mar. 5, 2002

(65) Prior Publication Data

US 2002/0125082 A1 Sep. 12, 2002

(30) Foreign Application Priority Data

Mar. 6, 2001 (JP) .......................................... 2001-062120

(51) Int. Cl.[7] ................................................ F16D 65/09
(52) U.S. Cl. ...................................... 188/78; 188/106 P
(58) Field of Search ................................ 188/78, 106 A, 188/106 F, 106 P, 325, 329, 330

(56) References Cited

U.S. PATENT DOCUMENTS 6,325,183 B2 * 12/2001 Kurihara ..................... 188/78

FOREIGN PATENT DOCUMENTS

JP 060337027 * 12/1994

* cited by examiner

Primary Examiner—Christopher P. Schwartz
(74) Attorney, Agent, or Firm—Liniak, Berenato & White

(57) ABSTRACT

A brake cable mounting structure for a drum brake has sufficient support to withstand the reaction force during the brake operation, a function to prevent damage to an inner cable and to prevent water ingress into the brake, a simple structure with less number of parts, and a low-cost advantage. Tubular members 10a, 10b are integrally formed on a back plate 10 by pressing, and a casing cap 22a of an outer casing 22 constituting a brake cable 20 is attached in the tubular members 10a, 10b.

6 Claims, 4 Drawing Sheets

BRAKE CABLE MOUNTING STRUCTURE FOR A DRUM BRAKE DEVICE

BACKGROUND OF INVENTION

1. Field of the Invention

This invention relates to a drum brake device comprising a mechanical expander. More specifically, this invention related to a brake cable mounting structure in which an outer casing of the brake cable is attached on a stationary back plate.

2. Description of Prior Art

A brake cable functioning as a remote operation means for a drum brake generally mainly comprises an inner cable for operating a brake lever, being connected with a brake shoe facing an inner circumferential surface of the drum brake, and an outer casing for protecting the inner cable from an open air exposure. A cable end fixed at a tip end of the inner cable at a drum brake side engages with a free end of the brake lever; and a casing cap in stepped shape fixed on the outer casing at the end thereof, is attached on a stationary back plate facing a brake drum at an opening side thereof A mounting section of the casing cap of the outer casing needs to have the following functions:

When the inner cable is pulled to operate the brake, a reaction force acts on the outer casing. Therefore, the outer casing needs to withstand the reaction force.

The drum brake is positioned at an unsprung portion of a vehicle while the operating side of the brake cable is positioned at a sprung portion of the vehicle. Hence, an operational direction of the reaction force acting on the mounting section of the casing cap slightly varies depending upon certain conditions such as vehicle weight and/or an air pressure of tires. Therefore, the outer casing needs to withstand such a biasing force.

Until the operating side of the brake cable is properly set in a vehicle body, i.e., when transporting the drum brake with the brake cable installed therein or mounting the same on the vehicle, if the outer casing is detached and moved toward the operating side of the brake cable, the inner cable is exposed out from the outer casing possibly causing a damage. Accordingly, the casing cap of the outer casing needs to be attached on the back plate so as to detach only if a predetermined external force is applied.

The outer casing needs to have an excellent waterproof function, because water ingress into the drum brake may deteriorate the brake performance.

In order to satisfy the above-requirements and needs, for example, the following structures are publicly disclosed:

A brake cable mounting structure of Provisional Japanese Patent Publication No. 6-337027 is characterized in that one end of a long tubular guide pipe extending in a brake axle direction is fixed on an anchor practically integrated with the back plate by affixation between an overhanging portion formed thereon and a widened end thereof; a small diameter column of a stepped casing cap slidably fits into the other end of the guide pipe at the outside of the brake until a large diameter over-hanging portion abuts thereagainst. A spring clip fits in an engagement groove of the small diameter column through a slit formed around the other end of the guide pipe; and thereafter the casing cap is fixed with the guide pipe to be practically integrated with the back plate.

Another brake cable mounting structure of Provisional Japanese Utility Model Publication No. 55-68734 is characterized in that the small diameter column of the stepped casing cap of the outer casing slidably fits into a back plate hole from the outside of the brake until a large diameter column abuts thereagainst; and a member, holding the small diameter column or the large diameter column both away from the fitting section, is fixed on the back plate.

That is, the casing cap is fixed on the back plate with two-point supporting and with the long span holing of the casing cap in an axial direction.

The conventional brake cable mounting structures for a drum brake have the following points to be improved.

The former invention, i.e., 6-337027, has problems in that it requires additional parts such as the tubular guide pipe and the spring clip and requires more time consuming and costly processes such as caulking the guide pipe on the back plate and cutting to form the slit in the guide pipe.

The latter invention, i.e., 55-68734, also has problems in that it requires additional parts such as the member to hold the casing cap of the outer casing and a bracket for fixing the casing cap on the back plate, thereby increasing the number of parts and making the mounting process more complex resulting in a higher cost of manufacturing.

This invention provides a brake cable mounting structure for a drum brake which has an excellent withstanding during the braking operation; does not possibly damage an inner cable while transporting the drum brake or mounting the same on a vehicle; and has an excellent waterproof function. Further, this invention provides a brake cable mounting structure for a drum brake of a simple structure with less number of parts and a lower cost.

SUMMARY OF THE INVENTION

In order to achieve the above-objects, in the brake cable mounting structure for a drum brake, the tubular member, for attaching the casing cap, is integrally formed on the back plate by pressing; and the casing cap of the outer casing is attached on the tubular member so as to detach only if a predetermined external force is applied.

The tubular member is integrally formed on a back plate by barring or processes of both drawing in a cup-shaped hollow and piercing to make a hole at a bottom of the drawn hollow.

In order to fit the casing cap of the outer casing in the tubular member on the back plate, the small diameter portion may be force-fit in the tubular member or a resilient ring putting in the ring-shaped groove of the small diameter portion may be resiliently fit in the tubular member.

Further, the tubular member may be stepped and integrally formed on the back plate.

The brake cable mounting structure for a drum brake as structured hereinabove realizes a long fitting section of the casing cap fitting the tubular portion of the back plate, thereby providing sufficient support to withstand the reaction force and biasing force acting on the outer casing. It also improves the waterproof function and prevents the damage to the inner cable because the casing cap is not detached unless the predetermined external force is applied. Accordingly, it provides a simple structured brake with the lower-cost.

The tubular member on the back plate may be integrally formed by pressing. Therefore, the processing of this portion is simple and is desirable for a mass production resulting in the lower manufacturing cost.

Fixing of the casing cap of the outer casing in the tubular member may be accomplished simply by pressing the casing cap into the tubular member, thereby facilitating the fixing process.

If the tubular member integrated with the back plate is formed in a stepped shape, the tubular member becomes longer, which may be applicable to various cable end to be fixed on the inner cable.

PREFERRED EMBODIMENT OF THE INVENTION

Referring to a brake cable mounting structure for a drum brake of this invention, a basic structure of the drum brake is previously described in the section explaining the conventional arts, and details of which are described in the references cited above and are incorporated herewith by reference. Therefore, an explanation of the brake cable herein is limited to the mounting section of the brake cable.

Figure 1:
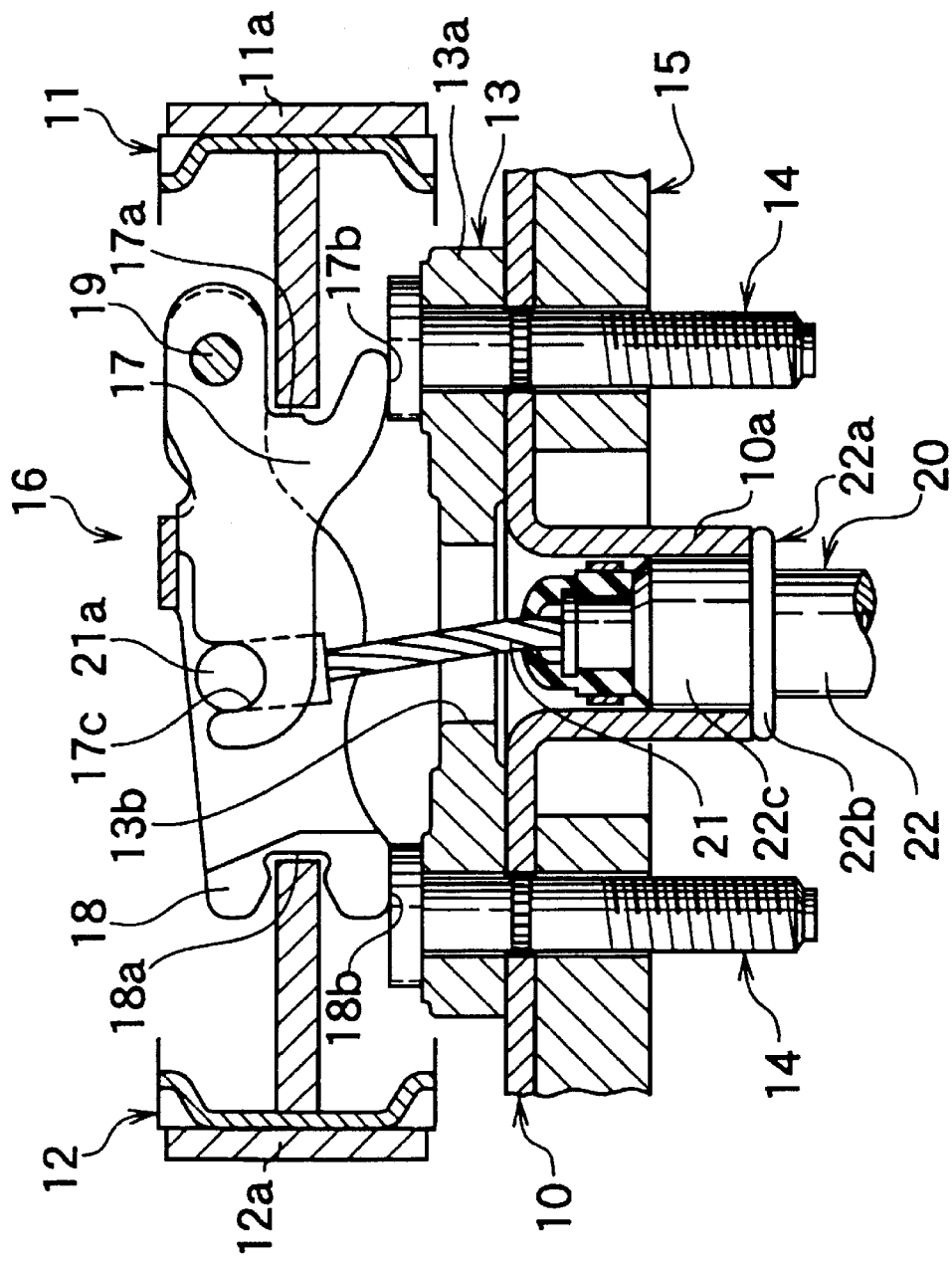
FIG. 1 is a cross-section view of the brake cable mounting section of the drum brake relating to Example 1 of this invention.

Referring to FIG. 1, Example 1 is a case when the brake cable mounting structure of this invention is applied in the former drum brake of the conventional art.

A pair of brake shoes 11, 12 are movably positioned on a back plate fixed in a facing opening side of a rotatable brake drum; and surfaces of the linings 11a, 12a are aligned with an inner circumferential surface of the brake drum with a slight clearance. An anchor seat 13a of an anchor 13 supporting one adjacent pair of ends of the pair of brake shoes 11, 12 is mounted on the back plate 10 and is fixed on a stationary part 15 of the vehicle by two bolts 14, 14. Accordingly, the back plate 10 and the anchor 13 together become stationary parts.

A mechanical expander 16 for moving the pair of brake shoes 11, 12 is slidably extended over the bolts 14, 14 reserving a slight clearance with one adjacent end of the pair of brake shoes 11, 12. The mechanical expander 16 comprises a brake lever 17 and a strut 18 with a lever pin 19. A notched groove 17a is formed on a right side of the brake lever 17 to engage with one brake shoe II; an upper side of the brake lever 17, positioned above the brake shoe 11, pivotally engages with a right end of the strut 18 by a lever pin 19; an arc-shaped surface 17b formed on an end surface of a lower side of the brake lever, positioned below the brake shoe 11, remains in sliding contact with a head of a right bolt 14; and an arc-shaped groove 17c is formed on an upper end surface of a free end on the brake lever 17 positioned between the pair of brake shoes 11 and 12. A notched groove 18a is formed at a left side of the strut 18 extending between the pair of brake shoes 11, 12 to engage with the other brake shoe 12; and a flat surface 18b formed on an end surface at a lower side of the strut 18, positioned below the brake shoe 12, remains in sliding contact with a head of the left bolt 14. The above-structure discloses a drum brake wherein both the anchor 13 and the mechanical expander 16 are provided between adjacent ends of the pair of brake shoes 11, 12. However, for a drum brake wherein the anchor 13 may be positioned between the other adjacent ends of the pair of brake shoes 11, 12 on the back plate 10, the arc-shaped surface 17b of the brake lever 17 and the flat surface 18b of the strut 18 may be kept in sliding contact with an inner surface of the back plate 10.

Components of the mechanical expander 16 are same as in the conventional devices. On the back plate 10 of this example, a straight tubular member 10a projects orthogonally relative to the back plate surface and gradually from a section between both bolts 14, 14 toward outside of the brake, or in another word, projects in a brake axle direction toward outside of the brake. This tubular member 10a is integrally formed on the back plate 10 by pressing, such as barring or processes both of drawing in a cup-shaped hollow and piercing a hole in a bottom of the drawing hollow. Any of the above-process is very simple and therefore this invention is suitable for mass production. Further, it is rather obvious that the length of the guide pipe 10a may be longer than thickness of the back plate.

A brake cable 20 mainly comprises an outer casing 22 and an inner cable 21 slidably fit in the outer casing 22 so as to protect the inner cable 21 from the open air exposure. At the drum brake side of the brake cable 20, a cable end 21a fixed on one end of the inner cable 21 penetrates through an anchor hole 13b pierced on the anchor seat 13a of the anchor 13 to engage with the arc-shaped groove 17c on the brake lever 17. On the other hand, a small diameter portion 22c of a stepped casing cap 22a fixed in one end of the outer casing 22 is designed to be force-fit into the tubular member 10a; and the small diameter portion 22c is further force-fit until a larger diameter over hanging portion 22b abuts against an end surface of the tubular member 10a. Accordingly, a fixing process for the casing cap 22a is facilitated; and once the casing cap 22a is fixed on the tubular member 10a, the casing cap 22a does not become detached unless a predetermined external force is applied thereto, thereby surely preventing damage to the inner cable 21 and water ingress into the brake. Further, if the casing cap 22a needs to be removed from the tubular member 10a, a properly shaped tool is simply inserted between contacting surfaces of the large diameter over hanging portion 22b of the casing cap 22a and the end surface of the tubular member 10a to twist the same. Therefore, changing the brake cable 20 can easily be done. The other side of the brake cable 20, not shown in the figure, is curved along the vehicle body to bring the other end of the inner cable 21 to be connected to a hand brake lever in a vehicle compartment; and the other end of the outer casing 22 is fixed on the vehicle body.

The above-structured brake operation is explained next.

A hand brake lever not shown in the figure in the vehicle compartment is pulled to operate the inner cable 21; and the brake lever 17 rotates-counterclockwise with the lever pin 19 as the fulcrum pressing the brake shoe 11 outward. A reaction force generated on the strut 18 presses the brake shoe 12 so as to cause frictional engagement between the linings 11a, 12a and a brake drum not shown in the figure for braking. When operating the inner cable 21, the reaction force acts on the casing cap 22a; and because the large diameter over hanging portion 22b is supported at the end surface of the tubular member 10a and the length of the small diameter portion 22c tightly fit in the tubular member 10a is comparably long, the biasing force does not deform the hollow of tubular member 10a, thereby offering an excellent withdrawing.

Figure 2:
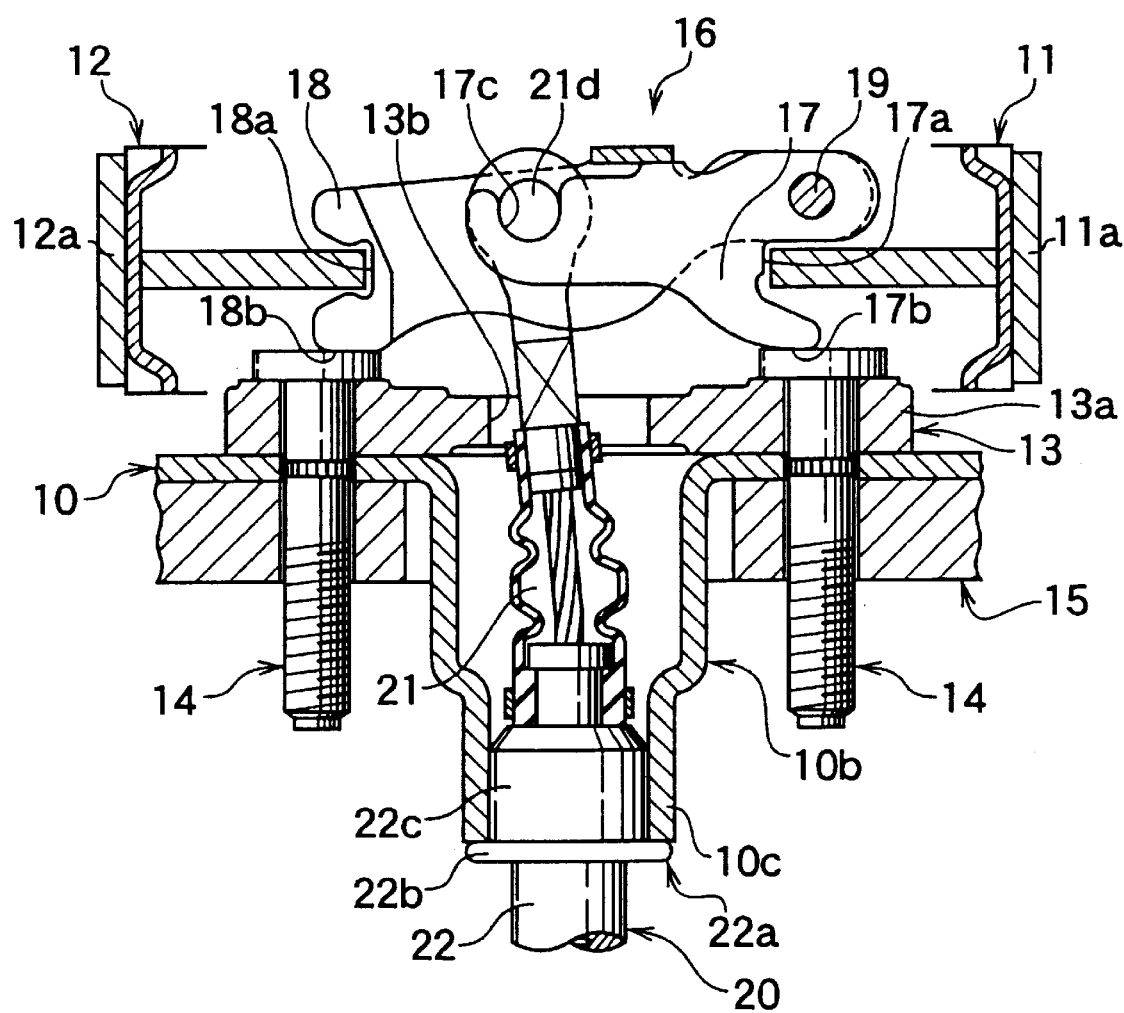
FIG. 2 is a cross-section view of Example 2 of this invention similar to FIG. 1.
Figure 3:
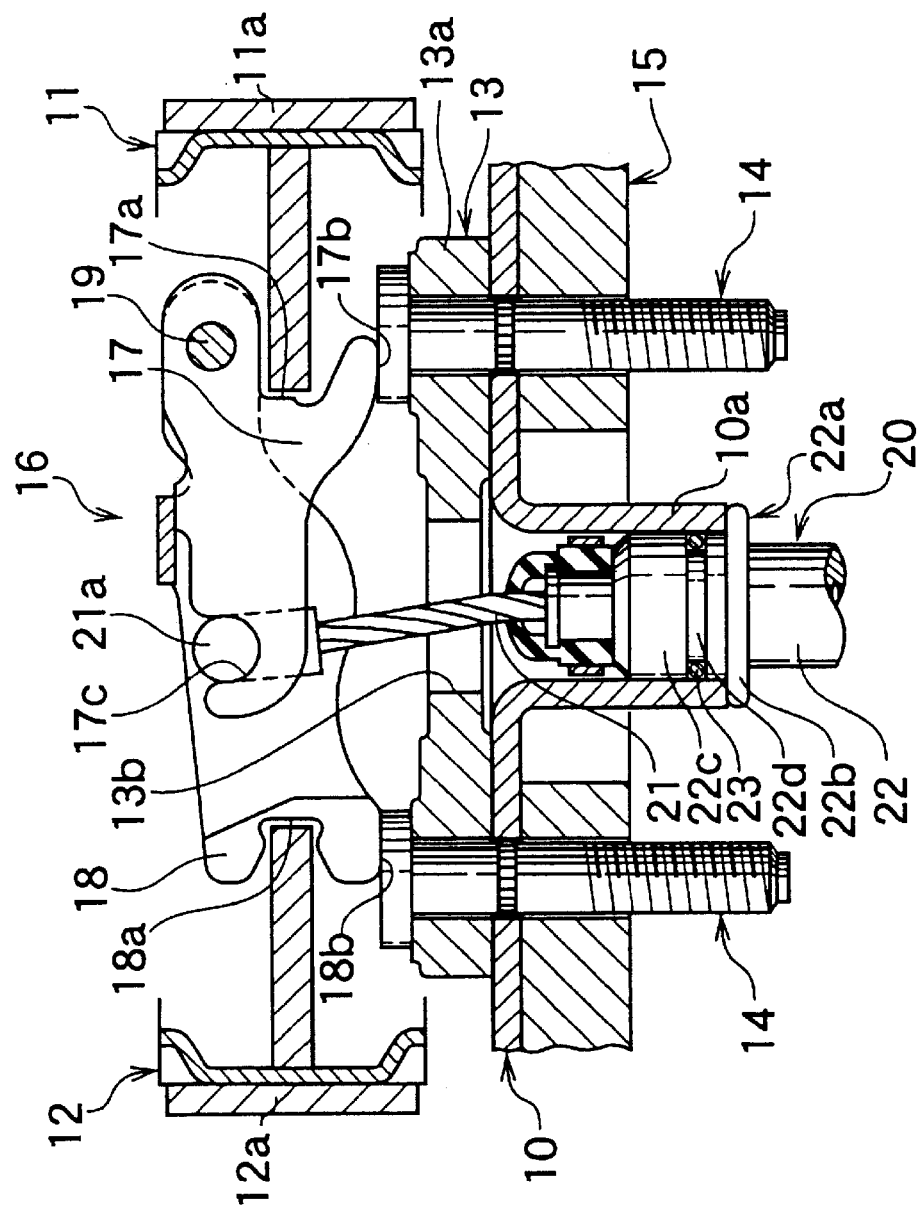
FIG. 3 is a cross-section view of Example 3 of this invention similar to FIG. 1.

Example 2 of this invention is explained with reference to FIG. 2. Comparing to Example 1, Example 2 relates to a tubular member suitable for a long cable end. Accordingly, the same reference numbers are assigned to the same parts or portions used in Example 1, explanation of which is omitted and the explanation is limited to different parts and portions.

In Example 2, the tubular member 10b integrally formed with the back plate 10 is to be stepped so as to guarantee a required stroke of the inner cable 21, enabling the entire length of the tubular member 10b to be longer. If the small diameter portion 22c of the casing cap 22a is force-fit into a small diameter tubular portion 10c at a top side of the tubular member 10b, it is obvious that almost same advantages as Example 1 may be obtained, and the explanation of which is omitted here.

An outside diameter of a small diameter portion 22c of the casing cap 22a of Example 3 is so designed that the small diameter portion 22c slidably fits in the tubular member 10a, and a ring-shaped groove 22d is formed at a central region of the small diameter portion 22c. An O-ring 23 fits in the ring-shaped groove 22d so that a periphery of the O-ring 23 projects slightly from a peripheral surface of the small diameter portion 22c. As such, the small diameter portion 22c of the casing cap 22a with the O-ring 23 fitting thereon is inserted into the tubular member 10a; and the O-ring 23 is contracted in the tubular member 10a causing the frictional engagement therebetween. Example 3 is applied in the tubular member 10a of Example 1; however, it is not limited to the tubular member 10a, and it is obvious that Example 3 is applicable to the stepped tubular member 10b of Example 2. Further, it is obvious that almost same advantages as Example 1 may be obtained, and the.explanation of which is omitted here.

Figure 4:
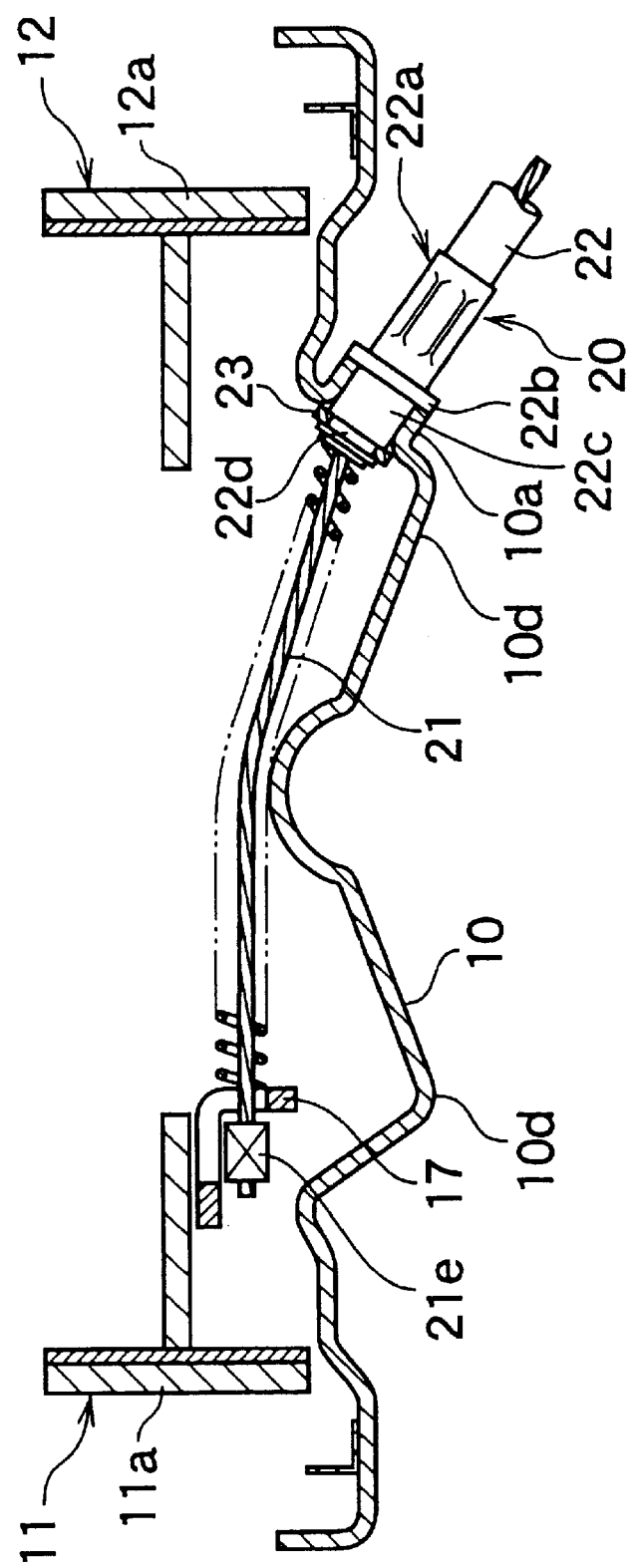
FIG. 4 is a cross-section view of Example 4 applying the brake cable mounting section in another type of drum brake.

Examples 1–3 of this invention explains the brake lever 17 in the drum brake being operated in a brake axle direction. Example 4, in which the brake cable mounting structure of this invention is applied to another type of drum brake wherein a brake lever 17 is pulled in an orthogonal direction relative to the brake axle, is explained with reference to FIG. 4. The structure of the drum brake is publicly known and an explanation of which is omitted here. Also, the same reference numbers are assigned to the same parts or portions as in Example 1, and the explanation of which is omitted here.

In Example 4, for the purpose of commonly utilizing for both right and left wheels, a pair of protrusions 10d, 10d projecting toward outside of the brake are symmetrically positioned away from each other on a back plate 10. A tubular member 10a is integrally formed only on a right slant surface of the right protrusion 10d in the figure. An outside diameter of the small diameter portion 22c of the casing cap 22a is slidably to fit with the tubular member 10a; the tubular groove 22d is formed on the top side of the small diameter portion 22c; and the O-ring 23 fits in the tubular groove 22d. The small diameter portion 22c of the casing cap 22a with the O-ring 23 is inserted in the tubular member 10a; and when the compressed O-ring 23 just pass the tubular member 10a, the outside diameter of the O-ring 23 expands to engage with an opening end of the tubular member 10a making the same fixed in place until the predetermined external force is applied. The inner cable 21 is guided by the protrusion at the central region of the back plate 10 to change the routing direction; and the cable end 21e is fixed on the end of the inner cable engages with the free end of the brake lever 17. It is noted that structures in Examples 1–3 are applicable to the mounting structure of the casing cap 22a on the tubular member 10a; and the effect and advantage are almost same, an explanation of which is omitted.

Overall, the mounting structure of the brake cable 20 of this invention is not limited to Examples 1–4; and for example, the process of force-fitting the casing cap 22a into the tubular members 10a, 10b according to Examples 1 or 2, resiliently fitting the O-ring 23 into the tubular members 10a according to Example 3 may be combined; or the O-ring 23 may be provided only for a sealing purpose while a wire spring ring may put in the ring-shaped groove 22d of the small diameter portion 22c to resiliently fit into the tubular member 10a, 10b.

Because of the above-explained structure, this invention has the following advantages:

The tubular member for the casing cap of the outer casing to be fixed therein may integrally formed with the back plate by pressing. Because the small diameter portion of the casing cap fits in the rather long tubular member and the large diameter portion is supported by the end surface of the tubular member, this invention provides sufficient support to withstand the reaction force and the biasing force during the brake operation.

The small diameter portion of the casing cap may be force-fit in the tubular member of the back plate; the O-ring fitting in the small diameter portion may resiliently fit into the tubular member; and the drum brake may be transported or mounted while the brake cable being installed. Therefore, damage to the inner cable and water ingress from the mounting section may be prevented securely. Further, this simple structure with less number of parts facilitates the fixing process of the casing cap on the tubular member resulting in reduction to the cost of manufacturing.

Press working of the tubular member on the back plate may be substituted for barring or processes both of drawing in a cup-shaped hollow and piercing a hole in a bottom of the drawing hollow for the integral formation. Therefore, this invention facilitates the formation process and is suitable for mass production.

Finally, the tubular member to be integrally formed on the back plate may be stepped so as to extend the entire length of the same, which facilitates a required stroke of the inner cable.

While the foregoing invention has been shown and described with reference to a number of preferred embodiments, it will be understood by those of skill in the art that various changes in form and detail may be made therein without departing from the spirit and scope of the instant invention.

I claim:

1. A brake cable mounting structure for a drum brake, comprising;

a stationary back plate facing an opening side of a brake drum, a casing cap in stepped shape, fixed on an outer casing at the end thereof, of a brake cable attached on the back plate from a brake exterior, and an inner cable of the brake cable slidably housed in the outer casing, the inner cable is being operated to move brake shoes via a brake lever, wherein a tubular member, for attaching the casing cap, is integrally formed on and extending from the back plate.

2. The brake cable mounting structure for a drum brake claimed in claim 1, wherein the tubular member is integrally formed on the back plate by burring.

3. The brake cable mounting structure for a drum brake claimed in claim 1, wherein the tubular member is integrally formed by processes of both drawing in a cup-shaped hollow and piercing to make a hole at a bottom of the drawn hollow.

4. The brake cable mounting structure for a drum brake claimed in claim 1, wherein the stepped casing cap of the outer casing has a small diameter portion and large diameter portion; and the small diameter portion of the casing cap is force-fit in the tubular member.

5. The brake cable mounting structure for a drum brake claimed in claim 1, wherein a small diameter portion of the stepped casing cap of the outer casing slidably fits in the tubular member; and a resilient ring fitting in a ring-shaped groove of the small diameter portion is resiliently fit in the tubular member.

6. The brake cable mounting structure for a drum brake claimed in claim 1, wherein the tubular member is a stepped tubular member integrally formed on the back plate; and a small diameter portion of the stepped casing cap fits in a small diameter tubular portion of the tubular member at an top end side thereof.

* * * * *